(12) United States Patent
Corghi

(10) Patent No.: US 6,240,995 B1
(45) Date of Patent: Jun. 5, 2001

(54) TIRE REMOVAL MACHINE AND RELATIVE ACCESSORIES

(75) Inventor: Remo Corghi, Correggio (IT)

(73) Assignee: Corghi S.p.A., Correggio (IT)

( * ) Notice: Subject to any disclaimer, the term of this patent is extended or adjusted under 35 U.S.C. 154(b) by 0 days.

(21) Appl. No.: 09/207,257

(22) Filed: Dec. 9, 1998

(30) Foreign Application Priority Data

Apr. 2, 1998 (IT) .............................................. RE98A0035

(51) Int. Cl.[7] .................................................. B60C 25/135
(52) U.S. Cl. ............................ 157/1.22; 157/14; 157/1.24
(58) Field of Search .................. 157/1.24, 1.26, 157/14, 1.22

(56) References Cited

U.S. PATENT DOCUMENTS

| | | |
|---|---|---|
| 4,173,245 | 11/1979 | Schaefer . |
| 4,738,294 * | 4/1988 | Fosse .................................. 157/14 X |
| 4,986,328 * | 1/1991 | Metzger ............................. 157/1.24 |
| 5,078,193 * | 1/1992 | Badelt .................................... 157/21 |
| 5,226,465 * | 7/1993 | Schon et al. .................... 157/1.24 X |
| 5,332,020 * | 7/1994 | Brunner ................................ 157/14 |
| 5,337,817 | 8/1994 | Steinbeck et al. . |
| 5,634,993 | 6/1997 | Drieux et al. . |
| 5,649,582 * | 7/1997 | Hjorth-Hansen ................ 157/1.24 X |
| 5,749,982 | 5/1998 | Muhlhoff et al. . |

FOREIGN PATENT DOCUMENTS

| | | |
|---|---|---|
| 0644071A1 | 3/1995 | (EP) . |
| 0838354A1 | 4/1998 | (EP) . |
| 641717 * | 8/1950 | (GB) ...................................... 157/14 |
| 1210394 | 9/1989 | (IT) . |

\* cited by examiner

Primary Examiner—James G. Smith

(57) ABSTRACT

An apparatus for mounting tires on a wheel rim and removing tires from a wheel rim which comprises a shaft member mounted for rotation on a base member, a hub member operatively associated with said shaft member for rotation therewith, said hub member containing a cavity therein, means for rigidly securing the wheel rim to a centrally disposed rod, said rod extending as free ends from opposite sides of said wheel rim for selectively mounting the wheel rim within the hub cavity from either of said opposite sides thereof, engaging means mounted for substantially vertical and horizontal movement relative to said shaft members for bringing said engaging means into contact with a tire to be mounted on the wheel rim, and actuator means for moving said engaging means in said substantially vertical and horizontal direction to achieve said contact with said tire.

9 Claims, 5 Drawing Sheets

TIRE REMOVAL MACHINE AND RELATIVE ACCESSORIES

BACKGROUND OF THE INVENTION

The present invention relates to machines for mounting a tire on an removing a tire from its wheel rim, and more particularly relates to machines able to adapt to all currently available types of tires and wheel rims, and to the optional accessories with which known machines can be provided.

Special tires are known which ensure that a vehicle is able to travel even under low pressure conditions, ie, when the tire inflation pressure is very low or close to zero, as happens in the case of a puncture. Such tires are known hereinafter simply as special tires.

These special tires comprise not only a external carcass but also a separate toroidal support ring made of elastomeric rubber, which is housed in an appropriate seat provided in the wheel rim well.

To enable the tire and the toroidal support ring to be mounted on the wheel rim, both the wheel rim and the tire are constructed with special profiles.

Specifically, the special tire has different diameters at its beads, with the result that the wheel rim is not symmetrical about a plane passing through its center. Furthermore the wheel rim includes seats for receiving the different-diameter beads. In addition the beads of the special tire have a much smaller thickness than those of known tires and tires are less resistant to mechanical stresses and more fragile than known beads.

These new special tires are described in French patent applications FR 92/15061 and FR 93/14702.

To remove or mount these special tires from the wheel rim or to the wheel rim, a procedure has to be used which cannot be followed by removal machines of the traditional type, because of the asymmetry of the tire beads and the need to insert the toroidal ring on the wheel rim.

Attempts to construct specific tire removal machines for this type of tire have been unsuccessful both for reasons of cost and because of the particular operating methods required.

SUMMARY OF THE INVENTION

The problem is solved according to the present invention by the provision of modifications to traditional machines and/or the use of a group of accessories provided therewith.

The group of accessories for tire removal machines of the traditional tire comprises:

a first assembly of removable means for receiving and fixing the wheel rim, a means to be fixed to the rotary platform of the machine to receive the wheel rim fixing means, and a means drivable in the direction of the wheel rim axis and arranged to press against the side of the tire.

BRIEF DESCRIPTION OF THE DRAWINGS

The operational and constructional characteristics of the present invention will be more apparent from the ensuing description of a preferred embodiment thereof given by way of non-limiting example and illustrated on the accompanying drawings, wherein.

DETAILED DESCRIPTION OF THE INVENTION

Figure 1:
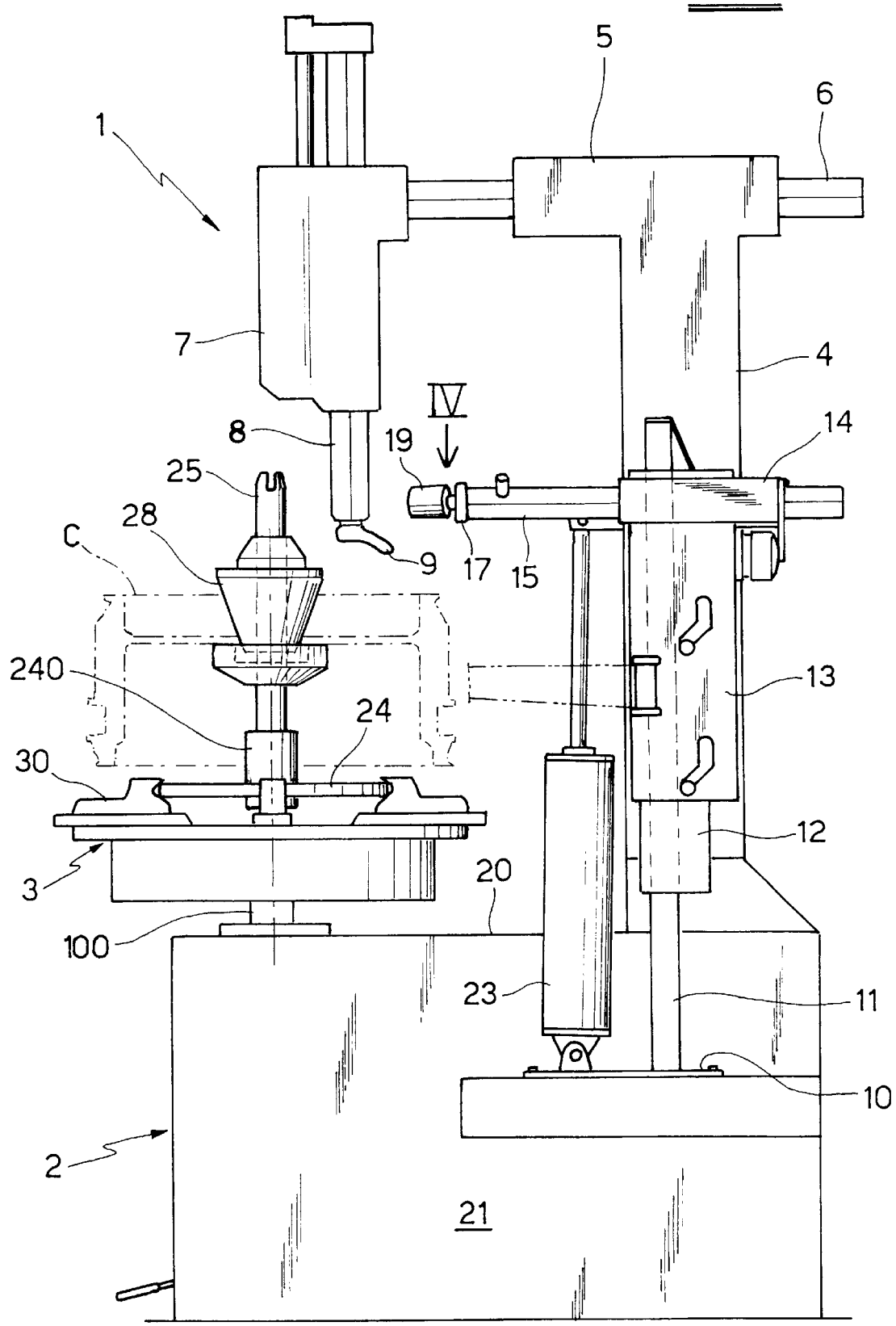
FIG. 1 is a side view of a tire removal machine on which the accessories of the present invention are installed.

The figures show the tire removal machine indicated overall by element 1 and comprise a base 2, from the upper surface 20 of which there emerges a shaft 100 of an electric motor, not shown, on which a usual self-centering device 3 is positioned. From the rear of the base 2 there extends a column 4, the end of which terminates in a tube 5 having a horizontal axis with an internal prismatic cross-section within which a bar 6 slides. With reference to FIG. 1, the front end of prismatic bar 6 supports a sleeve 7 having a vertical axis and within which slides a bar 8 having a prismatic cross-section at the lower end of the sleeve there is fixed the traditional tool 9 for removing the tire. Sliding of the bars 6 and 8 is facilitated by suitable counter-weights or springs, the bars being locked in their seats generally by constriction means.

On the lateral surface 21 of the base 2 there is applied a horizontal plate 10 from which a rod 11 upwardly extends.

The rod 11 forms the guide element for a vertically slidable tubular member 12, on which there is mounted in a vertically slidable manner a second tubular member 13 upperly provided with a sleeve 14 having a horizontal axis extending in a direction substantially radial to the self-centering device 3. Said sleeve 14 is arranged to receive a prismatic bar 15, to the end of which there is fixed a plate 17 on which two frusto-conical rollers 18 and 19 are idly and opposingly mounted. Their function is to urge the beads 300 and 301 (or side walls) of the tire into the seats 403 and 400 respectively of the wheel rim C.

Between the plate 10 and the upper end of the tubular member 13 there is interposed a double-acting cylinder-piston unit 23 having a rod which is hinged to the tubular member 13. The cylinder is also hinged to the plate 10 as shown in FIG. 1.

The assembly and the operation of the aforedescribed elements is illustrated in patent application RE93u000040 in the name of the present application.

The self-centering device is provided with four identical radially slidable jaws 30 arranged to grip the edge of a wheel rim of traditional type.

According to the present invention the jaws 30 grip a disc 24 which is coaxially disposed with respect to a central hub 240 having a vertical axis and having a through hole 241 traversed by a diametrical pin 242 disposed in a rod 25.

Figure 2:
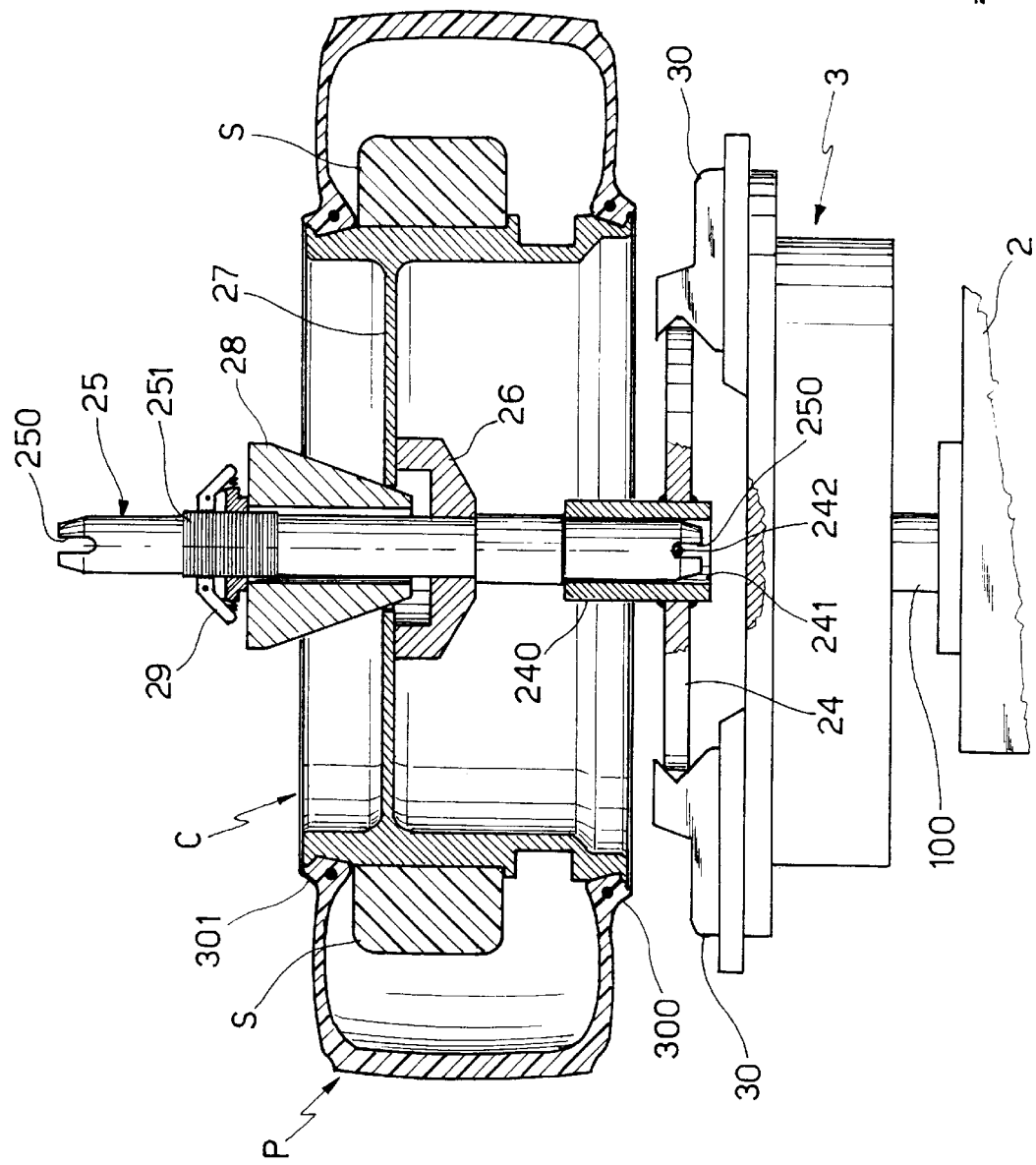
FIG. 2 is a partly sectional view of the accessories of the present invention in a first working position.

Specifically, the rod 25 has both its ends fork-shaped by virtue of the presence of a slot 250 for receiving the pin 242 of the hub 240. At about half way along its length, the rod 25 also supports a cup member 26 forming a circular ledge, on which there rests the disc 27 of the wheel rim C, as shown in FIG. 2.

The wheel rim C is maintained rigid with respect to the rod 25 by virtue of the cone member 28 and nut 29, of the quick-locking type. By being screwed onto the threaded portion 251 of the rod 25 the member 28 is maintained in the position shown in FIG. 2.

The operations to be carried out to mount the tire P on the wheel rim C using the accessories of the present invention are illustrated in FIGS. 5, 6, 7, 8.

Having rigidly locked the wheel rim C to the tire removal machine 1 by the aforesaid means, and with the smaller-diameter edge facing upwards, the operator mounts onto the wheel rim C the bead 300 of the tire P which is of greater diameter and the toroidal support ring S, By means of the cylinder-piston unit 23 the rollers 18 and 19 are brought into contact with the bead 301 of the tire P. At this point the self-centering device 3 is rotated and the pressure exerted by the rollers 18 and 19 against the bead 301 of the tire P then urges the bead 301 into the appropriate seat 400 of the wheel rim C. Simultaneously the support S moves until it rests against the relief edge 401 of the wheel rim C, and the bead 300 moves into its well 402.

Figure 3:
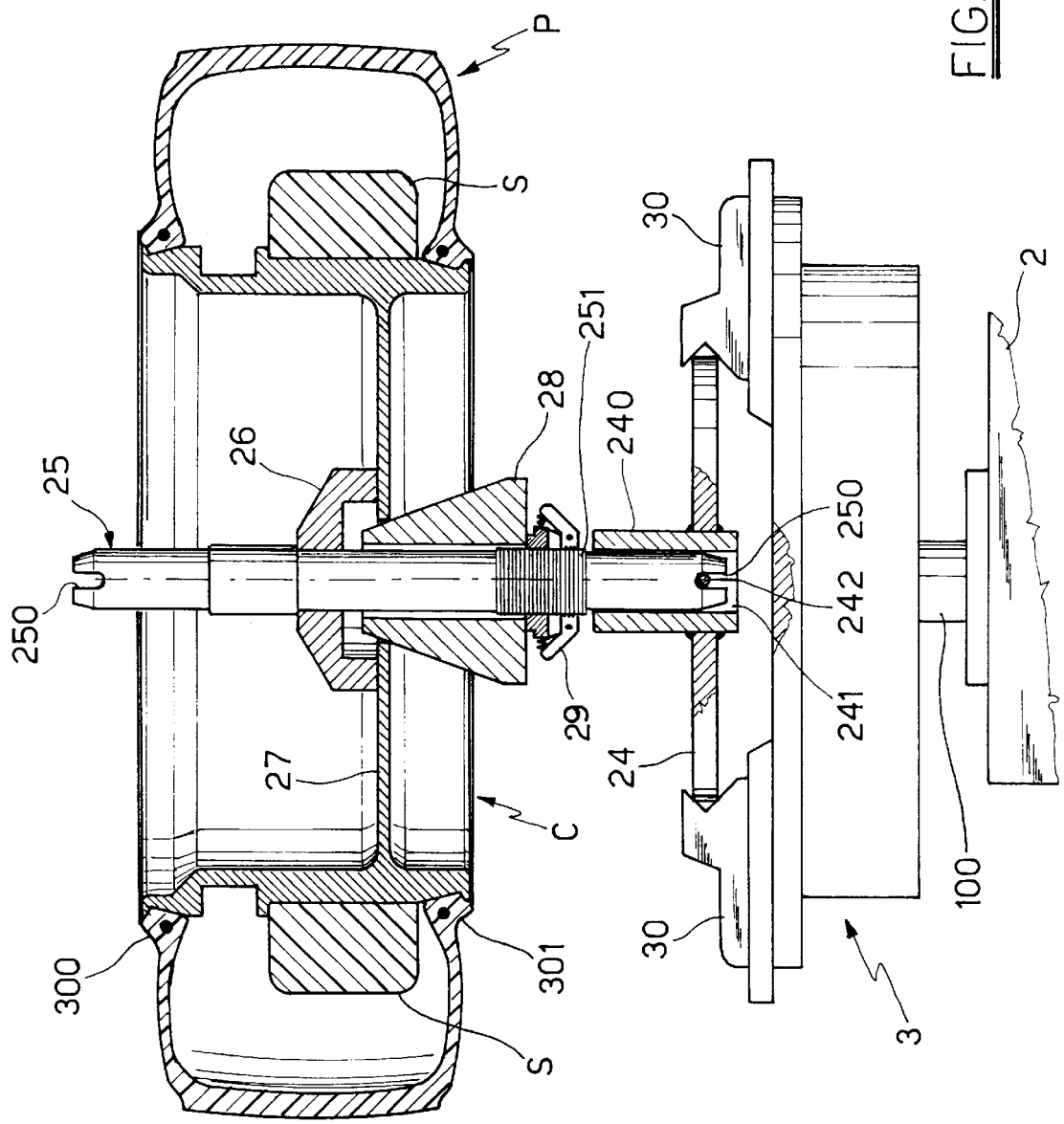
FIG. 3 is a partly sectional view of the accessories of the present invention in a second working position.
Figure 4:
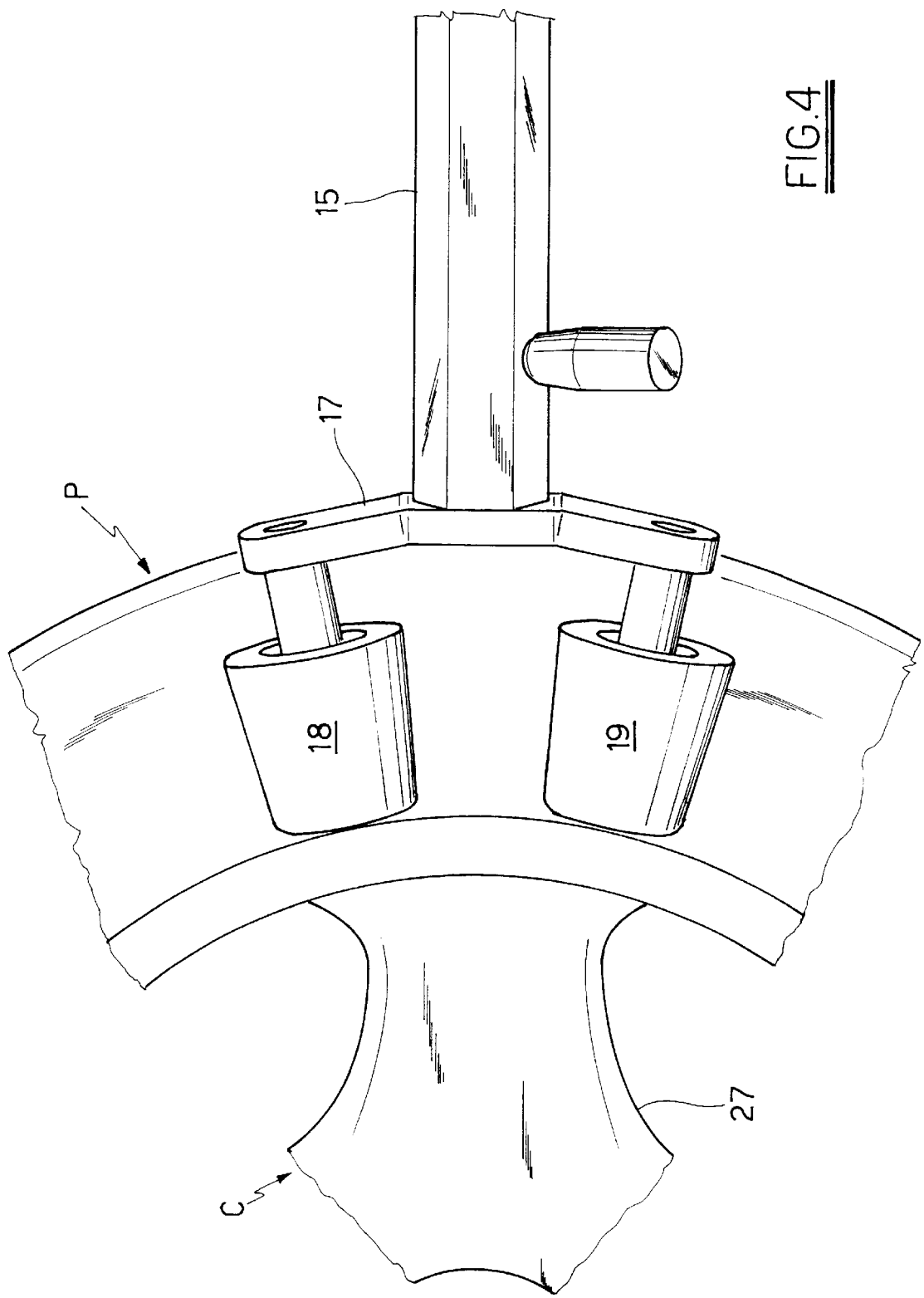
FIG. 4 is an enlarged detailed view of a means for pressing against the side of the tire.
Figure 5:
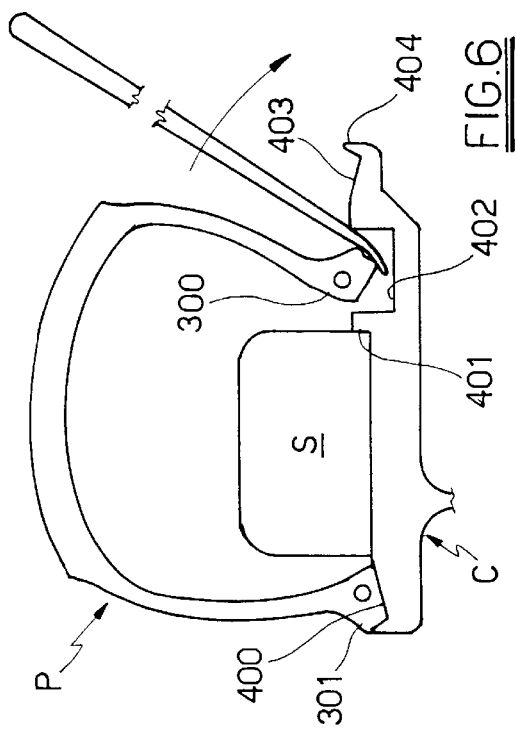
FIGS. 5, 6, 7, and 8 show the steps involved in mounting the special tire onto the wheel rim using the accessories of the present invention.
Figure 8:
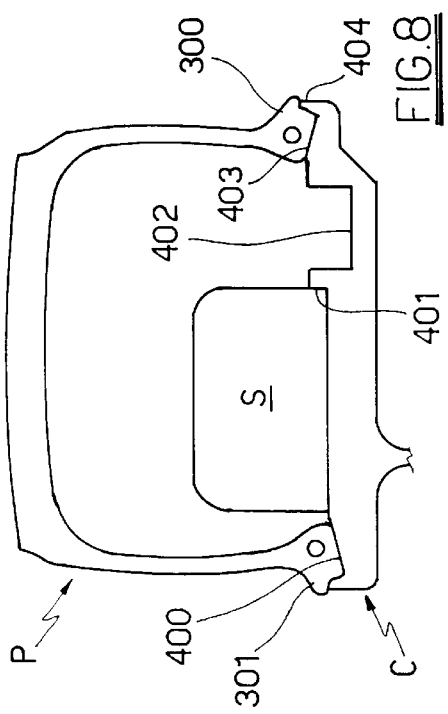

Having done this the operator inverts the wheel rim into the position shown in FIG. 3, ie, with the greater-diameter edge facing upwards.

To achieve this he raises the wheel rim while fixed to the rod 25, inverts the whole piece and reinserts the other end of the rod 25 into the hub 240 of the disc 24.

Figure 6:
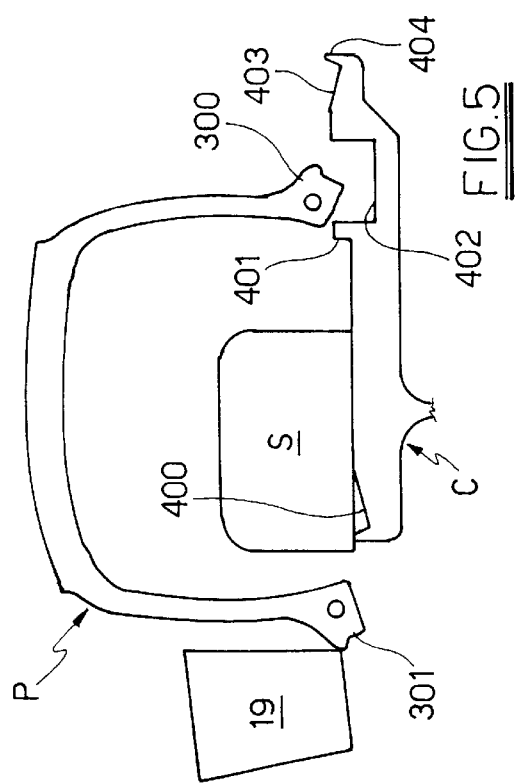
Figure 7:
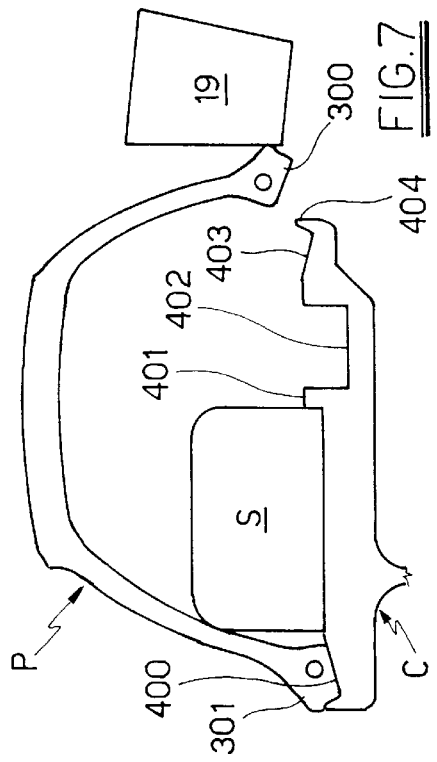

When in this position the operator extracts the bead 301 from the well 402 in the wheel rim C and moves it outside the wheel rim as shown in FIGS. 6 and 7.

Using a suitable lever, the operator extracts a portion of the bead 300 from the wheel rim C to create a gap between the bead 300 and the edge 404 of the wheel rim, into which gap he inserts the tool 9, after which he rotates the self-centering device to cause the entire bead 300 to withdraw from the wheel rim C, into the position shown in FIG. 7.

As a result of this inversion, the bead 300 lies above the edge of the wheel rim.

To complete the mounting of the tire P onto the wheel rim C the operator has to insert the bead 300 into the seat 403 of the wheel rim C. To achieve this the cylinder-piston unit 23 is operated to move the rollers 18 and 19 into contact with the bead 300 of the tire P, the self-centering device 3 is rotated, and the pressure exerted by the rollers on the bead 300 forces it into the appropriate set 403 of the wheel rim C.

The tire is removed from the wheel rim in the following manner;

the tire is deflated;

the wheel rim and rod 25 are inserted into the hub 240 with the smaller-diameter bead facing upwards, with reference to FIG. 2;

using the cylinder-piston unit 23 the rollers 18 and 19 are brought into contact with bead 301 of the tire P. At this point, by pressing against the bead edge with the rollers 18 and 19, a gap is formed into which a usual lever is inserted to extract a portion of the bead 301 from the wheel rim C;

the wheel is then inverted in the aforesaid manner;

the rollers 18 and 19 are brought into contact with the tire lateral wall and the self-centering device 3 is rotated to move the bead 300 beyond the relief edge 401, at this point the tire P leaves the wheel rim C.

It should be noted that the hub 240 can be mounted directly on the shaft 100 without interposing the self-centering device 3, in which case the resultant tire removal machine is able to operate only on the described type of special tire.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for mounting tires on a wheel rim which comprises:

a shaft member mounted for rotation on a base member, a hub member operatively associated with said shaft member for rotation therewith, said hub member containing a hub cavity therein, means for rigidly securing the wheel rim to a centrally disposed rod, said rod extending as free ends from opposite sides of said wheel rim for selectively mounting the wheel rim within said hub cavity from either of said opposite sides thereof, engaging means mounted for substantially vertical and horizontal movement relative to said shaft member for contacting a tire to be mounted on the wheel rim, and actuator means for moving said engaging means in said substantially vertical and horizontal direction to achieve said contact with said tire.

2. The apparatus of claim 1, whereas the hub member is connected directly to said shaft member.

3. The apparatus of claim 1, wherein the hub member is connected to a self-centering device which, in turn, is connected to said shaft member for rotation therewith.

4. The apparatus of claim 3, wherein the self-centering device comprises a disc member connected to said hub member which is centrally disposed in said disc member.

5. The apparatus of claim 1, wherein said rod has both of its free ends tapered and fork-shaped for ready insertion into the hub cavity and means for locking said free ends within said hub cavity.

6. The apparatus of claim 1, wherein the means for rigidly securing the wheel rim to said centrally disposed rod is a centering cone threadedly engaged to said rod and provided with a quick-manipulation nut.

7. The apparatus of claim 3, wherein the engaging means includes a pair of idle, conical rollers with their axes converging towards the central axis of the self-centering device for engagement with the tire for forming a gap between the bead portion of the tire and the edge of the wheel rim to enable the insertion of a bead raising tool therein.

8. The apparatus of claim 3, wherein said engaging means carries one idle roller, the axis of which is close to the central axis of the self-centering device.

9. The apparatus of claim 3, wherein the self-centering device includes a platform rotatably disposed on said base and provided with self-centering jaws and a disc for locking the wheel rim thereto said hub cavity being provided with a transverse pin for locking one of the two free ends of the rod in said hub cavity.

\* \* \* \* \*